United States Patent [19]

Flynn et al.

[11] Patent Number: 4,663,051
[45] Date of Patent: May 5, 1987

[54] REGENERATION OF MIXED BED DEMINERALIZERS

[75] Inventors: George C. Flynn, Chester; Douglas S. Johnstone, Martinsville, both of N.J.

[73] Assignee: The Graver Company, Union, N.J.

[21] Appl. No.: 786,534

[22] Filed: Oct. 11, 1985

[51] Int. Cl.⁴ ............................................. B01J 49/00
[52] U.S. Cl. ................................... 210/675; 210/686; 521/26
[58] Field of Search ....................... 210/675, 686, 678; 521/26

[56] References Cited

U.S. PATENT DOCUMENTS

| | | | |
|---|---|---|---|
| 3,582,504 | 6/1971 | Salem et al. | 210/675 |
| 4,191,644 | 3/1980 | Lembo et al. | 210/675 |
| 4,298,696 | 11/1981 | Emmett | 521/26 |
| 4,442,229 | 4/1984 | Emmett | 521/26 |
| 4,519,916 | 5/1985 | Martinola | 210/686 |

Primary Examiner—Ivars Cintins
Attorney, Agent, or Firm—Dressler, Goldsmith, Sutker, Shore and Milnamow

[57] ABSTRACT

The invention relates to improved methods for regenerating the exhausted anion and cation exchange resins in a mixed bed demineralizer system. The exhausted bed of resin is directed into a separation vessel which contains a buffer volume of anion and cation resins remaining therein from the previous regeneration cycle. The resin in the separation vessel is classified into an upper anion resin layer, a lower cation resin layer and an intermediate layer of intermingled anion and cation resin. The cation resin is transferred from the bottom of the separation vessel to a cation regeneration vessel through a cation transfer conduit having isolation valves associated with the respective ends thereof. The resin transfer is terminated upon the detection of anion resin in the transfer conduit, at which time the isolation valves are closed so as to isolate the bulk of the intermingled anion and cation resin layer in the cation transfer conduit. The resins remaining in the separation vessel are again classified and the bulk of the anion resin is withdrawn therefrom leaving behind a measurable quantity of anion resin and any remaining cation resin. The resin isolated in the cation transfer conduit is directed back into the separation vessel and combined with the resin therein to form the buffer volume for the next regeneration. Various alternative embodiments are disclosed which incorporate these techniques.

17 Claims, 23 Drawing Figures

REGENERATION OF MIXED BED DEMINERALIZERS

FIELD OF THE INVENTION

The present invention relates to improved methods for regenerating the exhausted anion and cation exchange resins in a mixed bed demineralizer system.

Mixed bed demineralizer systems containing anion and cation exchange resins for the purification of water have many industrial applications. A primary application of such a system is in the purification of water for condensate recirculation systems used to drive steam turbines. It is essential that this water be of an extremely high purity level in order to avoid any adverse effects on the surfaces of turbine blades, boilers, pipes, etc. Since it is desired to produce water that is free of any residue upon evaporation, the cation exchange resin must be in the hydrogen or ammonium form, and the anion exchange resin must be in the hydroxide form. In any event, it is conventional to regenerate the cation resin with a strong acid such as sulfuric or hydrochloric acid, and to regenerate the anion resin with a strong base, generally sodium hydroxide.

BACKGROUND OF THE INVENTION

It has heretofore been recognized that the in situ regeneration of anion and cation resins in the service vessel is not practical. Therefore, it is necessary to transfer the resins from the service vessel to a specially designed regeneration system. There are various designs of external regeneration systems currently in use. One design regenerates both the cation and anion resins in a single vessel. This type of system presents critical design problems to prevent the sodium hydroxide from contacting the cation resin and the sulphuric acid from contacting the anion resin. Because of this design problem and certain operational problems the single vessel regeneration system has not found wide acceptance.

Another design is a two vessel regeneration system in which the anion and cation resins are transferred into a separation/cation regeneration vessel. The resins are backwashed with water to expand the bed and classify the resins into an upper anion exchange resin layer and a lower cation exchange resin layer. The anion resin is then removed to an anion regeneration vessel where it is cleaned and regenerated. The cation resin is cleaned and regenerated in the separation/cation regeneration vessel. This design requires the complete separation of the anion exchange resin and the cation exchange resin. Various techniques have been used to effect such separation, including those disclosed in U.S. Pat. No. 3,385,787 to Crits et al, U.S. Pat. No. 3,429,807 to Burgess, U.S. Pat. No. 3,582,504 to Salem et al., U.S. Pat. No. 3,634,229 to Stanley Jr., U.S. Pat. No. 3,826,761 to Short, and U.S. Pat. No. 4,120,786 to Petersen et al. Although the above techniques have improved the degree of separation of the anion resin and the cation resin, they have not achieved complete separation. In practice, the consequence of imperfect separation is that a small proportion of the cation resin is inevitably saturated by the anion resin regenerant and conversely a small proportion of the anion resin is saturated by the cation resin regenerant. Both of which reduces the level of performance when the resins are returned to service.

In an effort to reduce the mixing of the anion resin and the cation resin at the interface between the resins after the backwash separation, it has been suggested to provide an intermediate layer of inert resin material of specific density intermediate the specific densities of the anion and cation resins. One example of such a system is disclosed in U.S. Pat. No. 2,666,741. The system disclosed in this patent hydraulically separates the resins in the service vessel into an upper anion resin layer, an intermediate inert resin layer and a lower cation resin layer. The anion resin and the cation resin are regenerated by passing sodium hydroxide regenerant into the inert layer and upwardly through the anion resin and passing acid regenerant into the inert layer and downwardly through the cation resin. Although this system provides advantages over other systems which regenerate in the service vessel, it has not solved many of the problems inherent in the regeneration of the anion resin and the cation resin in the service vessel. Also, the inert resin in the service vessel occupies space which can otherwise be occupied by additional anion and cation ion exchange resin. Accordingly, it is necessary to increase the size of the service vessel to make space for the inert resin.

The use of an intermediate density inert resin has also been heretofore disclosed in a two vessel regeneration system. Such a system is disclosed in U.S. Pat. Nos. 4,298,696 and 4,457,841. This system includes a separation/anion regeneration vessel and a cation regeneration vessel. The inert resin is mixed with the anion and cation resin in the service vessel. The resin from the service vessel is transferred into the separation/anion regeneration vessel wherein it is separated into an upper anion resin layer, an intermediate inert resin layer, and a lower cation resin layer. The cation resin layer is then hydraulically transferred to the cation regeneration vessel, leaving behind the anion resin and most of the inert resin. The anion resin is regenerated and rinsed in the separation/anion regeneration vessel and the cation resin is regenerated and rinsed in the cation regeneration vessel. The cation resin is then transferred back to the separation/anion regeneration vessel, wherein it is mixed with the anion resin and the inert resin and transferred back to a service vessel. This system also transfers the inert resin along with the anion and cation resin back into the service vessel and, thus, either results in reduced service capacity or requires an increase in the size of the service vessel. It should also be noted that the resin from each service vessel must include a quantity of inert resin. This system contemplates removal of any cation fines (heel) which are not separated out and transferred with the cation resin by the additional step of floating the anion resin in a saturated brine solution and removing the cation heel from the bottom of the separation/anion regeneration vessel.

A regeneration system has also been proposed in U.S. Pat. No. 4,388,417, assigned to the same assignee as the present invention, in which the inert resin remains in the regeneration system and is not returned to the service vessel. This system provides for the transfer of the exhausted anion and cation resins from the service vessel to a separation/anion regeneration vessel which contains a quantity of inert resin of a specific density intermediate to the specific densities of the anion and cation resins. Following a sequence of wash, drain, and air scrub steps, the resins are backwashed from a bottom distributor to classify the resins into an upper anion resin layer, an intermediate inert resin layer, and a lower cation resin layer. The cation resin layer is then transferred from the bottom of the separation/anion regeneration vessel into a cation regeneration vessel. Upon completion of the cation resin transfer, the separation/anion regeneration vessel is drained and caustic soda solution of a concentration in the range of 10-18% is cycled therethrough, causing the anion resin to float and any traces of cation resin and the inert material to sink to the bottom of the vessel, leaving a layer of caustic soda inbetween. The floating anion resin is then transferred from the separation/anion regeneration vessel to an anion rinse vessel wherein it is suitably rinsed and held. The inert resin and the cation heel are retained in the separation/anion regeneration vessel awaiting the delivery of the next exhausted resin charge. The cation resin in the cation regeneration vessel is regenerated with sulfuric acid and rinsed in a conventional manner. The anion resin is then transferred from the anion rinse vessel to the cation regeneration vessel wherein it is air mixed with the cation resin and final rinsed, whereupon the mixed anion and cation resin is held awaiting transfer to a service vessel.

A regeneration system is disclosed in U.S. Pat. No. 4,442,229, of the type disclosed in U.S. Pat. Nos. 4,298,696 and 4,457,841, wherein after separation and regeneration of the cation and anion resin, the resin in the separation vessel is further classified to cause contaminant cation resin to settle to the bottom of the vessel. The settled contaminant cation resin and some anion material is transferred from the bottom of the separation vessel through the cation transfer conduit into a separate isolation vessel. The regenerated cation resin is transferred back into the separation vessel and remixed with the regenerated anion resin, which mixture is then removed from the separation vessel. The materials from the isolation vessel are then transferred back into the separation vessel to await receipt of the next batch of mixed bed of resins to be regenerated. This patent also discloses the utilization of the cation transfer conduit to isolate the contaminant cation resin and some anion resin instead of an isolation vessel.

SUMMARY OF THE INVENTION

The present invention is specifically directed to improve upon the hereinabove referred to systems for regeneration of mixed bed deminerlizers. The present invention is further directed to provide such a regeneration system which can be retrofitted on existing regeneration systems with minimal impact on existing equipment and without requiring major piping and control sequence changes.

Briefly stated, the systems and methods for regenerating a mixture of exhausted anion and cation exchange resins, in accordance with the principles of the present invention, isolate an intermingled anion and cation resin interface layer within the cation transfer conduit between a pair of control valves positioned adjacent the respective ends thereof. A buffer volume of essentially pure anion resin is deliberately maintained in the separation vessel to facilitate the separation of the cation and anion resins and thereby avoid the problems associated with contaminated cation resin being returned to service.

In accordance with one preferred system and method of the present invention, the exhausted bed of anion and cation resins is directed into a separation/anion regeneration vessel which contains a buffer volume of anion resin and the cation resin heel remaining therein from the previous regeneration cycle. A classifying liquid is passed upwardly through the separation/anion regeneration vessel to separate the resin contained therein into an upper anion resin layer, a lower cation resin layer and an intermediate layer of intermingled anion and cation resin. The classified resins are transferred from the bottom of the separation/anion regeneration vessel into and through a cation transfer conduit, having a first end portion in communication with the bottom of the separation/anion regeneration vessel and a second end portion in communication with a cation regeneration/hold vessel. The first and second end portions of the cation transfer conduit are respectively provided with suitable first and second isolation valves. The transfer of resin from the separation/anion regeneration vessel is terminated upon the detection of the entry of anion resin into the cation transfer conduit, at which time the first and second control valves are closed so as to isolate the bulk of the intermingled anion and cation resin layer in the cation transfer conduit between the first and second control valves. The cation resin in the cation regeneration/hold vessel is regenerated in a well known manner by passing an acid regenerant liquid therethrough. The anion resin in the separation/anion regeneration vessel is regenerated and the resin in the vessel is classified into an upper layer of regenerated anion resin and a lower layer of remaining traces of cation resin; which regeneration and classification may be accomplished either in separate steps or a single step in accordance with alternative embodiments of the invention. In the separate step alternative, a regenerant liquid is passed through the resin in the vessel followed by the passage of a classifying liquid through the resins in the vessel. In the single step alternative, the regeneration of the anion resin and the classification of the resins in the vessel is accomplished simultaneously by passing an intermediate density regenerant solution through the resins in the vessel causing the anion resin to float and the cation resin to settle. The bulk of the upper layer of regenerated resin is transferred from the separation/anion regeneration vessel to the cation regeneration/hold vessel through an anion transfer conduit, leaving a measurable quantity of the regenerated anion resin and the lower layer of remaining cation resin in the separation/anion regeneration vessel. The intermingled anion and cation resin isolated in the cation resin transfer conduit is flushed back into the separation/anion regeneration vessel to be combined with the anion and cation resin remaining in the vessel to form the buffer volume of anion and cation resin for the next regeneration cycle.

In accordance with a preferred embodiment of the invention, the separation/anion regeneration vessel has a cone shaped bottom portion and the first end portion of the cation transfer conduit is in communication with a lowermost portion of the cone shaped bottom portion and the anion resin transfer conduit has a first end in communication with the vessel at an elevation a predetermined distance above the lowermost portion of the cone shaped bottom so as to leave the lowermost section of the regenerated anion resin layer in the separation/anion regeneration vessel during the transfer of the anion resin from the separation/anion regeneration.

The principles of the present invention may be practiced in alternative embodiments, which embodiments are particularly applicable for use in retrofitting existing conventional external regeneration systems which have experienced improper segregation of the anion and cation resin prior to regenerant application. These systems typically already include a cation regeneration vessel, an anion regeneration vessel and a mix/hold vessel. The present invention contemplates embodiments which utilize these existing vessels and a large portion of the piping and controls associated therewith.

In accordance with a second preferred embodiment of the invention, a system is provided which can utilize the existing vessels from a conventional external regeneration system and requires the addition or modification of a limited amount of piping and sequence controls. A separation vessel of the type discussed with regards to the above discussed embodiment of the invention is provided to receive and classify the exhausted mixed bed resins from a service vessel. A cation transfer conduit, having first and second control valves associated with the respective ends thereof, is provided to communicate at its respective ends with a lowermost portion of the separation vessel and the cation regeneration vessel. An anion transfer conduit is provided to communicate at its respective ends with a portion of the separation vessel above the lowermost portion thereof and the anion regeneration vessel. The classified resins are transferred from the bottom of the separation vessel through the cation transfer conduit to the cation regeneration vessel. The resin transfer from the separation vessel is terminated upon the detection of anion resin in the cation transfer conduit in a similar manner as discussed above such that the cation resin is contained in the cation regeneration vessel, the intermingled anion and cation resin layer is isolated in the cation transfer conduit and the anion resin and a small quantity of cation resin remains in the separation vessel. The anion resin is transferred from the separation vessel through the anion transfer conduit to the anion regeneration vessel, deliberately leaving behind a measurable quantity of anion resin and the small quantity of remaining cation resin. The resin isolated in the cation transfer line is flushed back into the separation vessel and combined with the resin already in the separation vessel to form a buffer volume of anion and cation resin remaining in the vessel until the next regeneration cycle. The cation regeneration vessel and anion regeneration vessel now respectively contain perfectly separated cation resin and anion resin and the system proceeds with the regeneration, rinsing and mixing of these resins in a conventional regeneration sequence.

The present invention further contemplates adddiitional process options to the second embodiment of the invention. In accordance with a first option, a procedure is provided for removal of cation resin which result from resin bead breakdown over a period of time and tend to accumulate and remain in the anion resin layer after hydraulic classification. The present invention contemplates the periodic introduction of a dilute caustic solution (12-16%) into the separation vessel after removal of the cation resin therefrom to separate the anion resin and the cation resin fines between a layer of the intermediate density caustic solution in a manner as disclosed in U.S. Pat. No. 3,634,229. The settled cation resin fines are then removed through a portion of the cation transfer conduit downstream of the first control valve and directed to waste.

In accordance with a second option, a procedure is provided for simultaneous regeneration and separation of the anion resin in the separation vessel following removal of the cation resin therefrom. As in the first option, a dilute caustic solution is introduced into the separation vessel to regenerate the anion resin and settle out the cation fines. In this option the anion resin is regenerated in the separation vessel during every regeneration cycle. The cation fines may be periodically removed in the manner indicated with regards to the first option. After regeneration of the anion resin, the anion resin is permitted to settle towards the bottom of the separation vessel and the anion resin is then transferred to an anion rinse vessel. The cation resin in the cation regeneration vessel is regenerated and rinsed and the anion resin in the anion rinse vessel is rinsed and the resins are combined in a mix/hold vessel for transfer to storage or back into service.

BRIEF DESCRIPTION OF THE DRAWINGS

The invention will be best understood by reference to the following detailed description, taken in conjunction with the drawing, in which.

DESCRIPTION OF PREFERRED EMBODIMENT

The description of the preferred embodiments of the regeneration methods in accordance with the present invention which hereinbelow follows are disclosed in conjunction with diagrammatic representations of exemplary regeneration system apparatus as depicted in the drawings. It will be readily realized by one skilled in the art that the regeneration methods of the present invention may be utilized with alternative regeneration system apparatus. Accordingly, the disclosure of a specific regeneration station is for exemplary purposes only, and not to indicate a limitation as to the scope of the invention.

Referring to FIGS. 1-9, a diagrammatic representation of an ion exchange resin regeneration system is illustrated depicting the steps of a first preferred embodiment of the regeneration method of the present invention. For simplicity of illustration, these figures are in flow sheet form, it being understood that connection between the various vessels or tanks may be obtained by suitable piping and that the supply of necessary fluids into the vessels as hereinbelow disclosed is through suitable piping, only some of which piping is specifically illustrated. Further, the use of suitable automatic controls are anticipated to control the sequence of the method steps in accordance with the invention. Reference is made to the disclosures in the above identified prior art patents for disclosure of conventional piping and control arrangements, the modification of which to permit the system to operate in accordance with the principles of the present invention is within the skill of one of ordinary skill in the art.

Referring to FIGS. 1-9, the system comprises a service vessel 10, a separation/anion regeneration vessel 12 and a cation regeneration/hold vessel 14. An exhausted resin tranfer conduit 16 extends between service vessel 10 and separation/anion regeneration vessel 12 for transfer of exhausted resin from the bottom of vessel 10 to an upper section of vessel 12. A regenerated resin transfer conduit 20 extends between service vessel 10 and cation regeneration/hold vessel 14 for transfer of regenerated resin from the bottom of vessel 14 to an upper section of vessel 10. Conduits 16 and 20 are respectively provided with control valves 18 and 22 to control fluid flow therethrough.

For reasons which will hereinbelow become more apparent, separation/anion regeneration vessel 12 is provided with an inverted conical floor 24 in a lower section thereof for support of resin thereabove. The area defined by the conical floor 24 is hereinbelow referred to as the lowermost portion or area 26 of vessel 12. A cation resin tranfer conduit 28 extends between vessel 12 and cation regeneration/hold vessel 14 for transferring cation resin from vessel 12 to vessel 14. Conduit 28 has a first end portion 30 which communicates with the lowermost portion 26 of vessel 12 and a second end portion 32 which communicates with an upper section of vessel 14. End portions 30 and 32 of conduit 28 are respectively provided with control or isolation valves 34 and 36 to control fluid flow therethrough. An anion resin transfer conduit 38 extends between vessel 12 and vessel 14. Conduit 38 has a first end portion 40 which communicates with vessel 12, a short distance above lowermost portion 26, and a second end portion 42 which communicates with an upper section of vessel 14. A control valve 44 is provided in conduit 38 to control fluid flow therethrough.

Figure 1:
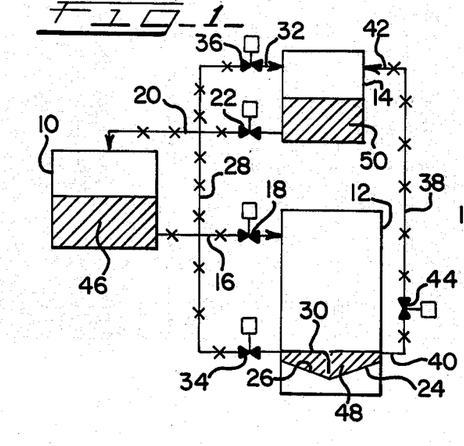
FIGS. 1-9 are diagrammatic or schematic representations illustrating the sequential steps of a first preferred embodiment of the invention.

The regeneration method of a first preferred embodiment of the invention will now be described with reference to FIGS. 1-9, which diagrammatically illustrate the sequence of steps in accordance therewith. Referring to FIG. 1, the system is depicted immediately prior to commencement of the regeneration sequence. Service vessel 10 contains a mixed bed of completely, or partially, exhausted anion and cation resins indicated by the reference numeral 46. Separation/anion regeneration vessel contains a buffer volume of anion resin and remnants of cation resin in lowermost portion 26 below the elevation of end portion 40 of conduit 38, as indicated by the reference numeral 48. Cation regeneration/hold vessel contains a mixed bed of regenerated anion and cation resins, as indicated by the reference numeral 50. Control valves 18, 22, 34, 36 and 44 are closed.

Figure 2:
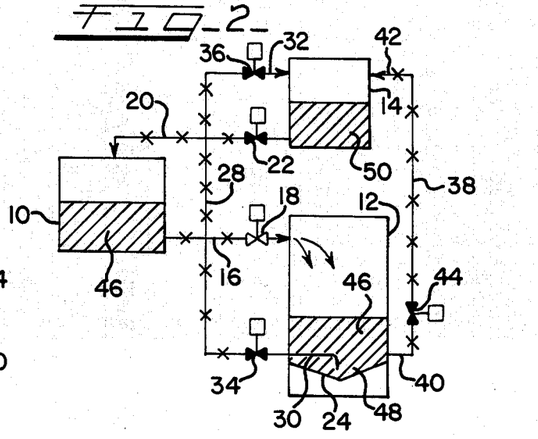

Referring to FIG. 2, the regeneration cycle is initiated by opening control valve 18 and transferring a slurry of the exhausted mixed resin bed 46 from service vessel 10 through conduit 16 into separation/anion regeneration vessel 12. A source of motive water (not shown) is directed into vessel 10 to facilitate the transfer of bed 46 from vessel 10 to vessel 12. Upon completion of such transfer, the control valve 18 is closed.

Figure 3:
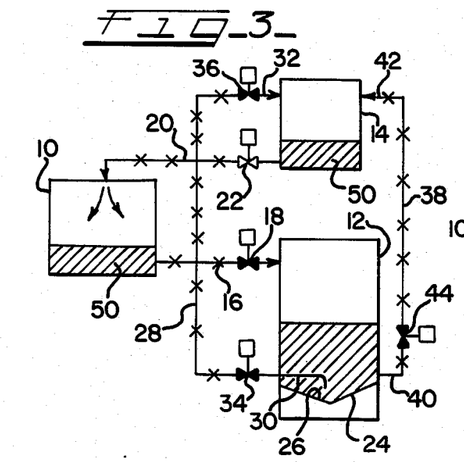

Referring to FIG. 3, after transfer of the exhausted resin bed 46 into vessel 12, the control valve 22 is opened and a slurry of the standby charge of regeneration anion and cation resins 50 is transferred from the cation regeneration/hold vessel to the service vessel 10 through conduit 20. A source of motive water (not shown) is directed into vessel 14 to facilitate the transfer of the regenerated resins 50 from vessel 14 to vessel 10. Upon completion of such transfer, the control valve 22 is closed and the service vessel 10 may be returned to service.

Figure 4:
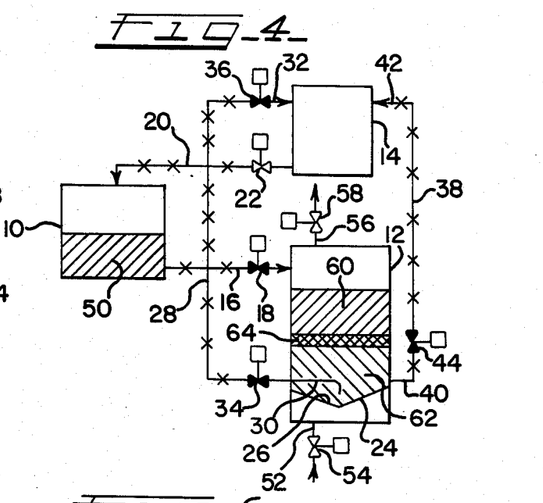

Referring to FIG. 4, a sequence of backwashing and classification steps are provided to clean and classify the resins contained within separation/anion regeneration vessel 12. As depicted in FIG. 4, vessel 12 is provided with a water inlet line 52, having a control valve 54 associated therewith, for directing backwash water into the bottom of vessel 12. Vessel 12 is also provided with a water outlet line 56, having a control valve 58 associated therewith, for withdrawing water therefrom. As is well known in the art, a source of pressurized gas (not shown) is preferably provided in communication with line 52 to facilitate the cleaning of the resins during the sequence of backwashing steps. The passage of water upwardly through the resins contained in vessel 12 causes an expansion of the resin bed and thereby separates the bed into an upper anion resin layer 60, a lower cation resin layer 62, and a layer 64 of intermingled anion and cation resins intermediate layers 60 and 62. Such backwashing and classification techniques are well known in the art, specific examples of which are described in the prior art patents hereinabove discussed. Upon completion of the backwash and classification sequence, the control valve 58 is closed.

Figure 5:
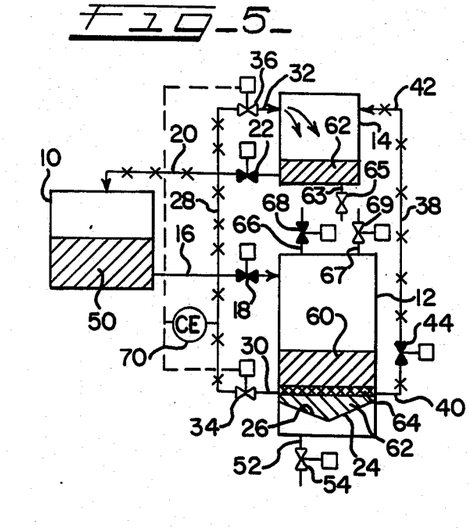

Referring to FIG. 5, after completion of the classification of the resins in separation/anion regeneration vessel 12, the next step is to transfer the layer of cation resin 62 from vessel 12 through cation transfer conduit 28 to cation regeneration/hold vessel 14. This is accomplished by opening control valves 34, 36, 69, and 54. Motive gas entering, vessel 12 through line 67 and sluicing water entering vessel 12 through line 52 conveys the cation resin from the bottom of vessel 12 through conduit 28 into vessel 14. A water outlet line 63, having a control valve 65 associated therewith, drains the sluice water from vessel 14. The completion of the transfer of the cation resin from vessel 12 to vessel 14 may be terminated in many ways well known in the art. In accordance with the preferred embodiment depicted in FIG. 5, a conductivity cell 70 is located in communication with transfer conduit 28 immediately downstream of control valve 34 to measure the conductivity of the slurry passing through conduit 28. Since the conductivity of the cation resin slurry is different from the conductivity of the anion resin slurry, the conductivity cell 70 is utilized to indicate when the slurry being transferred changes from all, or substantially all, cation resin to a mixture of cation and anion resin. Put another way, the conductivity cell 70 detects the entry of anion resin into the transfer conduit 28. Upon detection of the entry of a mixture of cation and anion resin in transfer conduit 28, the transfer of resin from vessel 12 is terminated by closing valves 34 and 36. At this point, vessel 12 contains anion resin layer 60, a small quantity of the intermingled anion and cation resins layer 64, and any cation fines that may be in the system. Vessel 14 contains substantially uncontaminated cation resin. The bulk of the intermingled anion and cation resins layer is isolated in transfer conduit 28 between valves 34 and 36.

Figure 6:
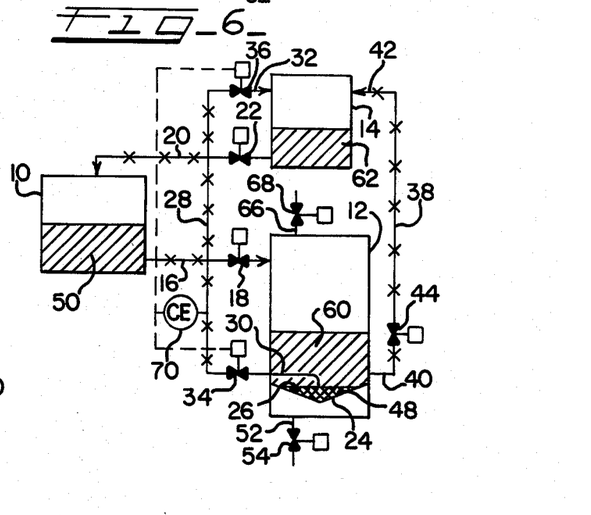

The next series of operative steps are to get the cation resin in vessel 14 and the anion resin in vessel 12 ready for regeneration in a conventional manner and directing an appropriate regenerant solution through the vessels. The anion resin in vessel 12 is regenerated in a conventional manner by directing caustic soda (sodium hydroxide) of a concentration in the range of 4–18% through the vessel. The cation resin in vessel 14 is regenerated in a conventional manner by directing an acid regenerant (i.e. 10% sulphuric acid) through the vessel. The regenerated resins in vessels 12 and 14 are then rinsed in a conventional manner. Upon completion of these steps, vessel 12 contains regenerated anion resin, traces of cation resin and cation fines and vessel 14 contains regenerated cation resin. A secondary separation or classification of the resins contained in vessel 12 is then performed to separate the regenerated anion resin from the remaining cation resin. This step may be performed either by hydraulic means, as discussed hereinabove in conjunction with the original classification step, or by floatation means, by utilization of an intermediate density liquid to float the anion resin and settle the cation resin between an intermediate layer of liquid. In either case, the cation resin settles to the bottom of vessel 12 into the lowermost portion 26 thereof. The system is now as depicted in FIG. 6.

Figures 7, 8, 9, 10:
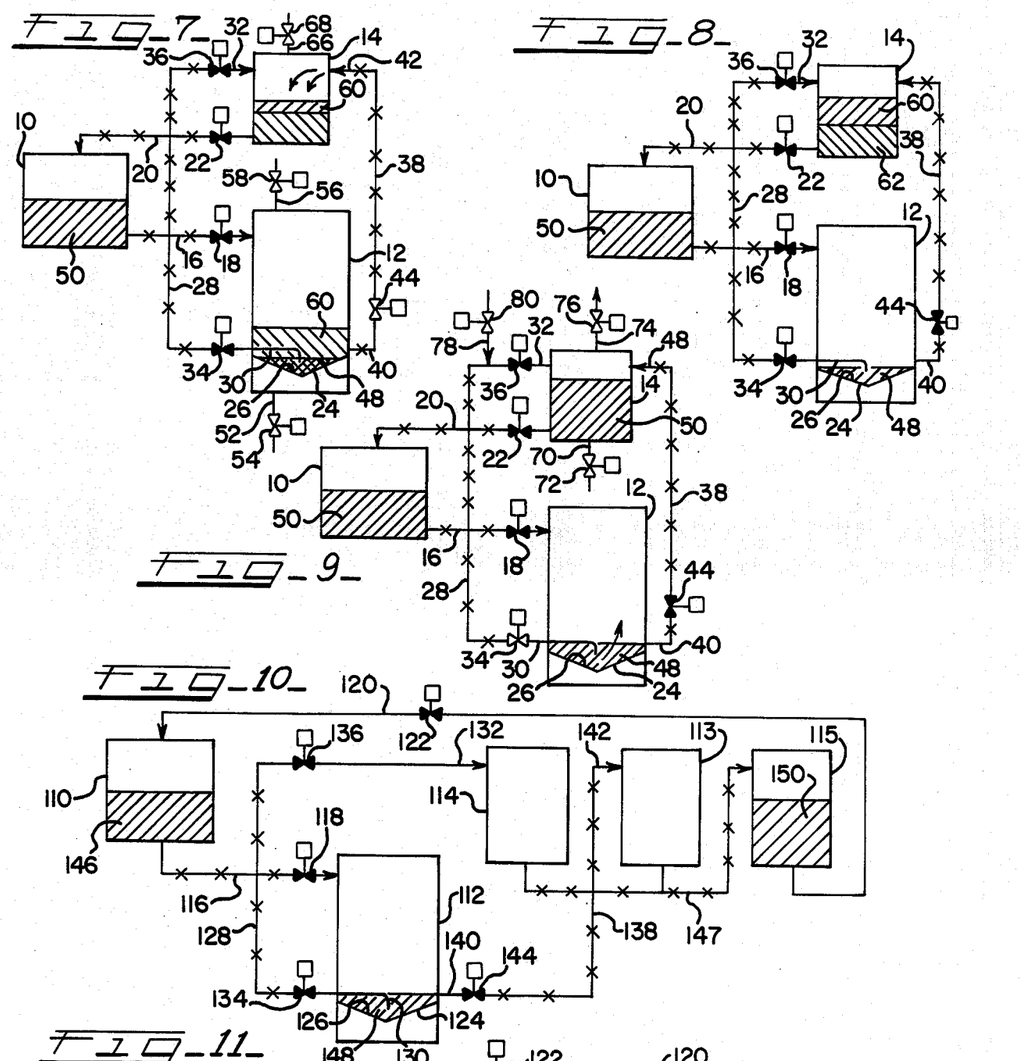
FIGS. 10-16 are diagrammatic or schematic representations illustrating the sequential steps of a second preferred embodiment of the invention.

Referring to FIG. 7, the bulk of the regenerated anion resin from separation/anion regeneration vessel 12 is withdrawn through anion transfer conduit 38 and transferred to cation regeneration/hold vessel 14. The transfer may be effected by directing motive air or water, or both, into vessel 12 through lines 52 or 66. As hereinabove indicated, the first end portion 40 of conduit 38 communicates with vessel 12 at an elevation a short distance above area 26. In accordance with the present invention, the elevation of end portion 40 is selected to ensure that it is at an elevation, or take off point, above the elevation of the interface between the regenerated anion resin layer 60 and the layer of residual cation resin, if present, contained in vessel 12. In so doing, a measurable quantity of regenerated anion resin is deliberately left behind in vessel 12 upon completion of this transfer step. This assures that none of the contaminated cation resin is transferred to vessel 14. Upon completion of the transfer of the bulk of the regenerated anion resin to vessel 14, a small buffer volume 48 of regenerated anion resin and the layer of residual cation resin remain in vessel 12, as depicted in FIG. 8. This buffer volume serves to buffer the potential entrainment and subsequent carry-over to vessel 14 of contaminated cation resin which may have been isolated in area 26.

Referring to FIG. 9, the regeneration sequence is completed by mixing the regenerated anion and cation resins in cation regeneration/hold vessel 14 and sluicing the resins isolated in cation transfer conduit 28 back into separation/anion regeneration vessel 12. The regenerated resins in vessel 14 are preferably air mixed in a conventional manner by directing pressurized air through air line 70 having a control valve 72 associated therewith. The air is vented from vessel 14 through a vent line 74 having a control valve 76 associated therewith. The resins isolated in conduit 28 are sluiced back into vessel 12 by opening valve 34 and directing flush water into conduit 28 immediately before closed valve 36 via a flush water line 78 having a control valve 80 associated therewith. Upon completion of these sequence steps, vessel 14 contains a mixed bed of regenerated anion and cation resins and vessel 12 contains a buffer volume of anion and cation resins. The system is now ready for the next regeneration sequence.

Referring to FIGS. 10–16, a diagrammatic representation of an ion exchange resin regeneration system is illustrated depicting the steps of a second preferred embodiment of the regeneration method of the present invention. The system comprises a service vessel 110, a separation vessel 112, a cation regeneration vessel 114, an anion regeneration vessel 113 and a mix/hold vessel 115. Vessels 113, 114 and 115 are typically present in existing regeneration systems and it is contemplated that this embodiment may be utilized in retrofitting such existing systems to utilize the concepts of the present invention with minimum structural additions and changes and minor interfacing with the existing system.

An exhausted resin transfer conduit 116 extends between service vessel 110 and separation vessel 112 for transfer of exhausted resins from the bottom of vessel 110 to an upper portion of vessel 112. A regenerated resin transfer conduit 120 extends between service vessel 110 and mix/hold vessel 115 for transfer of regenerated resin from the bottom of vessel 115 to an upper portion of vessel 110. Conduits 116 and 120 are respectively provided with control valves 118 and 122 to respectively control fluid flow therethrough.

Separation vessel 112 is preferably constructed as discussed hereinabove with regards to vessel 12. That is, vessel 112 is provided with an inverted conical floor 124 in a lower section thereof which defines a lowermost portion or area 126 of vessel 112. A cation resin transfer conduit 128 extends between vessel 112 and cation regeneration vessel 114 for transferring cation resin from vessel 112 to vessel 114. Conduit 128 has a first end portion 130 which communicates with lowermost portion 126 of vessel 112 and a second end portion 132 which communicates with an upper section of vessel 114. End portions 130 and 132 of conduits 128 are respectively provided with control or isolation valves 134 and 136 to control fluid flow therethrough. An anion resin transfer conduit 138 extends between vessel 112 and vessel 113. Conduit 138 has a first end portion 140 which communicates with vessel 112, a short distance above lowermost portion 126, and a second end portion 142 which communicates with an upper section of vessel 113. A control valve 144 is provided in conduit 138 to control fluid flow therethrough. A regenerated resin transfer conduit 147 extends between vessels 113 and 114 and vessel 115.

The regeneration method of the second preferred embodiment of the invention will now be described with reference to FIGS. 10–16, which diagrammatically illustrate the sequence of steps in accordance therewith. Referring to FIG. 10, the system is depicted immediately prior to commencement of the regeneration sequence. Service vessel 110 contains a mixed bed of completely, or partially, exhausted anion and cation resins indicated by the reference numeral 146. Separation vessel 112 contains a buffer volume of anion and cation resins in lowermost portion 126 below the elevation of end portion 140 of conduit 138, as indicated by the reference numeral 148. Vessel 115 contains a mixed bed of regenerated anion and cation resins, as indicated by the reference numeral 150. Control valves 118, 122, 134, 136 and 144 are closed.

Figure 11:
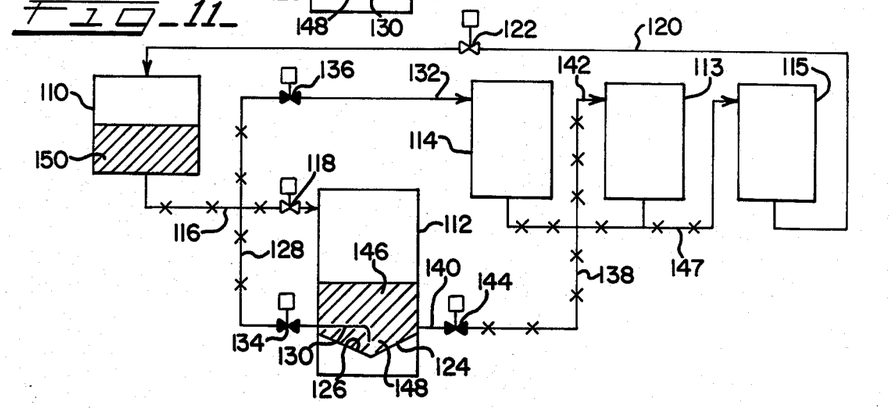

Referring to FIG. 11, the regeneration is initiated by opening control valve 118 and transferring a slurry of the exhausted mixed resin bed 146 from service vessel 110 through conduit 116 into separation vessel. Upon completion of such transfer, the control valve 118 is closed and control valve 122 is opened to direct a slurry of the standby charge of regenerated anion and cation resins 150 from vessel 115 to vessel 110 through conduit 120. Upon completion of such transfer, the control valve 122 is closed. These resin transfer steps are accomplished in the same manner as indicated hereinabove with regards to the first preferred embodiment.

Figure 12:
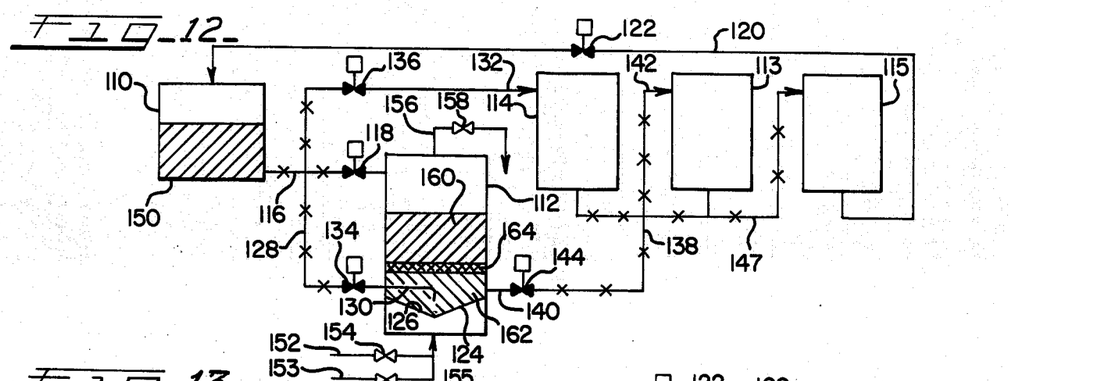

Referring to FIG. 12, a sequence of backwashing and classification steps are provided to clean and classify the resins contained within vessel 112. As depicted in FIG. 12, vessel 112 is provided with a water inlet line 152, having a control valve 154 associated therewith, for directing backwash and separation water into the bottom of vessel 112, and an air inlet line 153, having a control valve 155 associated therewith, for directing pressurized air into the bottom of vessel 112 for resin cleaning. Vessel 112 is also provided with a venting outlet line 156, having a control valve 158 associated therewith for withdrawing air during resin cleaning and water during backwashing and separation. The passage of water upwardly through the resins contained in vessel 112 causes an expansion of the resin bed and thereby separates the bed into an upper anion resin layer 160, a lower cation resin layer 162, and a layer 164 of intermingled anion and cation resins intermediate layers 160 and 162. Such backwashing and classification techniques are well known in the art, as discussed in the hereinabove referenced prior art patents. Upon completion of the backwash and classification sequence, control valves 158 and 154 are closed.

Figure 13:
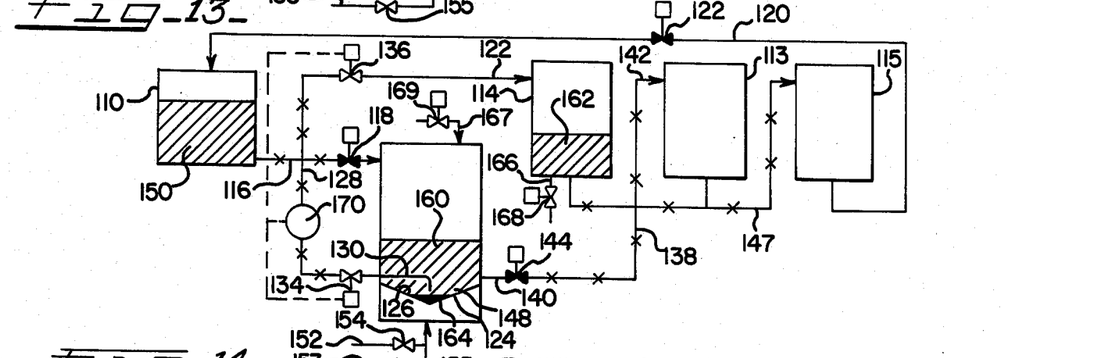

Referring to FIG. 13, after completion of the classification of the resins in vessel 112, the next step is to transfer the layer of cation resin 162 from vessel 112 through cation transfer conduit 128 to cation regeneration vessel 114. This is accomplished in a similar manner as discussed hereinabove with regards to the first preferred embodiment, by opening control valves 134, 136, 169 and 154. The motive water and air entering vessel 112 through lines 152 and 167 respectively carries the cation from the bottom of vessel 112 through conduit 128 into vessel 114. A water outlet line 166, having a control valve 168 associated therewith, withdraws the motive water from vessel 114. The completion of the transfer of the cation resin from vessel 112 to vessel 110 is preferably terminated in the manner as set forth hereinabove by utilization of a conductivity cell 170, located in communication with transfer conduit 128 immediately downstream of control valve 134. Thus, detection of the entry of a mixture of cation and anion resin in transfer conduit 128, the transfer of resin from vessel 112 is terminated by closing valves 134 and 136. At this point, vessel 112 contains anion resin layer 160, a small quantity of the intermingled anion and cation resins layer 164, and any cation fines that may be in the system. Vessel 114 contains substantially uncontaminated cation resin 162. The bulk of the intermingled anion and cation resins layer is isolated in transfer conduit 128 between valves 134 and 136.

Figure 14:
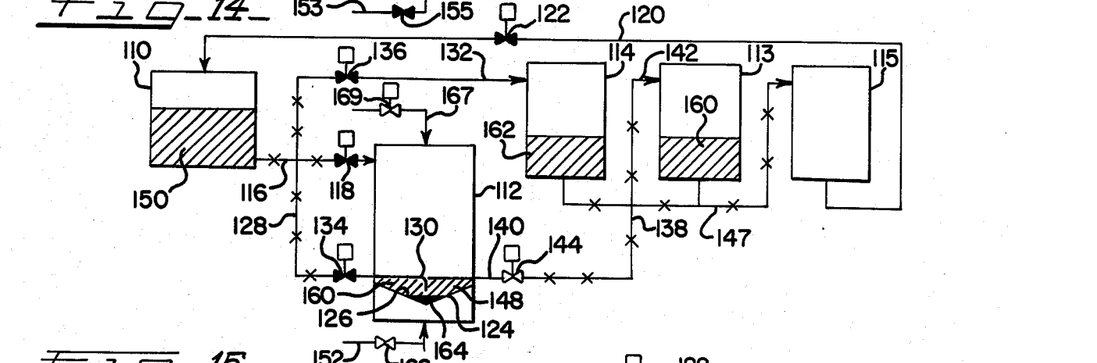

Referring to FIG. 14, the bulk of the anion resin is transferred from vessel 112 through conduit 138 to vessel 113. This transfer may be effected by directing motive air or water, or both, into vessel 112 through lines 152 and 167. As hereinabove indicated, the first end portion 140 of conduit 138 communicates with vessel 112 at an elevation a short distance above area 126. The elevation of end portion 140 is selected to ensure that it is at an elevation, or take off point, above the elevation of the interface between the anion resin layer 160 and the layer intermingled cation and anion resins and the residual cation resin in the vessel. In so doing, a measurable quantity of regenerated anion resin is deliberately left behind in vessel 112 upon completion of the transfer step. As discussed hereinabove with regards to the first preferred embodiment of the invention, a small buffer volume 148 of exhausted anion resin and the layer of residual cation 164, if any, resin remain in vessel 12. This buffer volume serves to buffer the potential entrainment and subsequent carry-over to vessel 113 of contaminated cation resin which may have been isolated in area 126.

Figure 15:
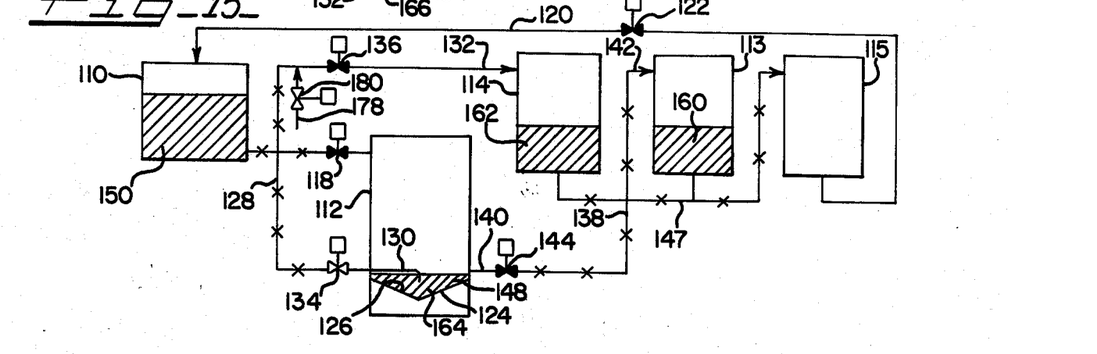

Referring to FIG. 15, the resins isolated in conduit 128 are sluiced back into vessel 112 by opening valve 134 and directing flush water into conduit 128 immediately before closed valve 136 via a flush water line 178, having a control valve 180 associated therewith. Upon completion of these sequence steps, vessel 112 contains a buffer volume 148 of anion and cation resins and is placed in a standby mode ready for the next regeneration cycle.

Figure 16:
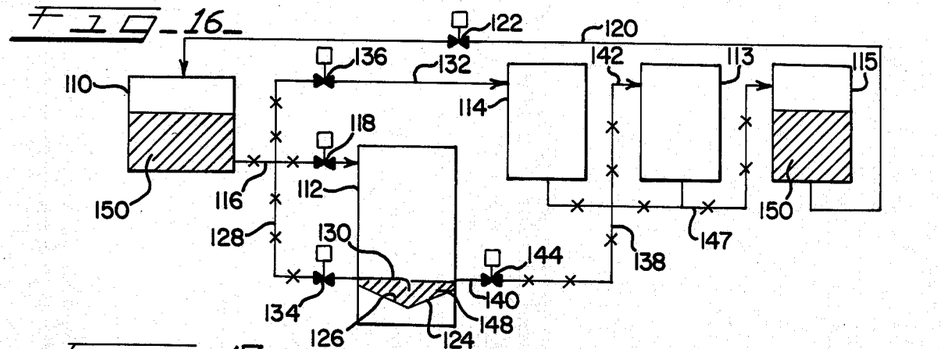

The regeneration sequence is then completed in a well known conventional manner. That is, the anion resin in vessel 113 and the cation resin in vessel 114 are readied for regeneration and an appropriate regenerant solution is directed through the vessels as discussed hereinabove with regards to the first preferred embodiment of the invention. Upon completion of the regeneration and rinsing of the resins in vessels 113 and 114, the regenerated resins are transferred to mix/hold vessel 115 through line 147, wherein the resins are air mixed and final rinsed in a conventional manner. The system is now as depicted in FIG. 16 ready for the next regeneration cycle.

Figure 17:
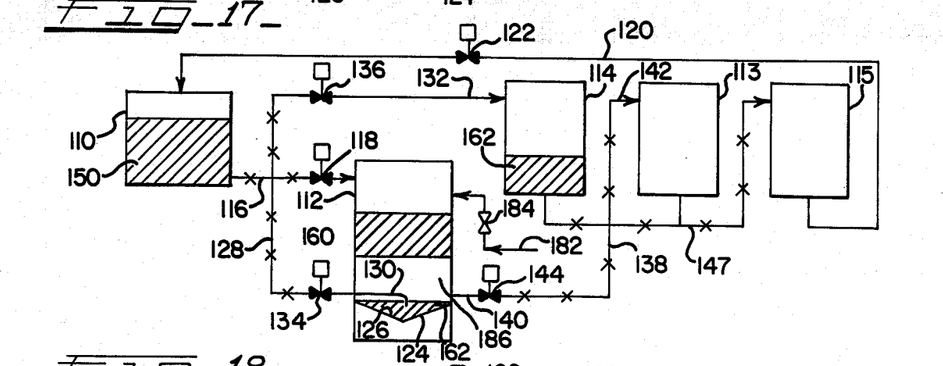
FIGS. 17-19 are diagrammatic or schematic representations illustrating the sequential steps of a third preferred embodiment of the invention.
Figure 18:
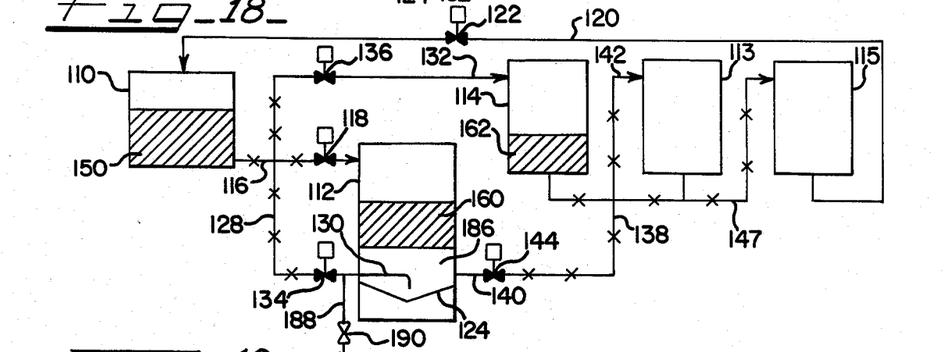
Figure 19:
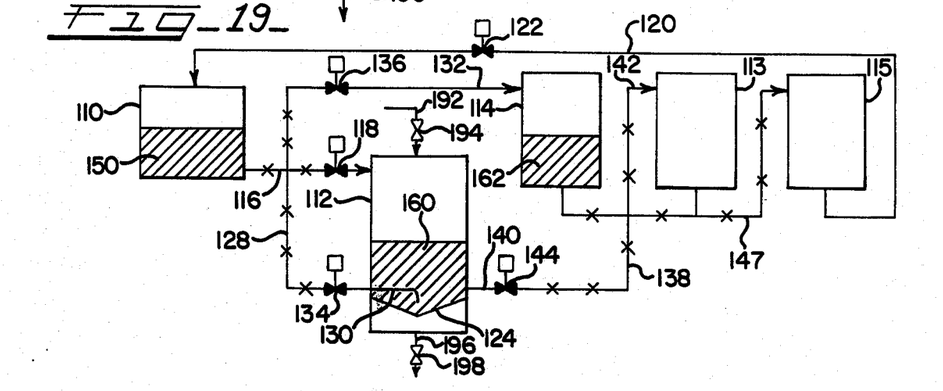

Referring to FIG. 17-19, a third preferred embodiment of the invention will now be described. This embodiment is similar to the second preferred embodiment as discussed hereinabove with the addition of a sequence of cation fines blowdown steps. In accordance with this embodiment, the regeneration method as described above with regards to the second preferred embodiment proceeds through the step of transferring the cation resin from vessel 112 to vessel 114. Referring to FIG. 17, following the cation resin transfer step, a moderately concentrated caustic solution (12–16%) is introduced into vessel 112 through line 182 by opening control valve 184 associated therewith. The dilute caustic solution causes the lighter anion resin layer 160 to float in the caustic solution 186 and the denser cation resin fines to settle into area 126, as depicted in FIG. 17. This floatation separation is independent of particle size and will allow the denser cation resin fines to settle through the less dense anion resin bed to the bottom of the vessel. Referring to FIG. 18, after separation of the anion resin and the cation fines, the settled cation fines can be removed from vessel 112 via transfer conduit 128 and a blowdown line 188, having a control valve 190 associated therewith. The cation fines passing through line 188 are directed to waste. Referring to FIG. 19, following removal of the cation fines, the anion resin remaining in vessel 112 is appropriately rinsed by directing water downwardly through vessel 112 via line 192, having a control valve 194 associated therewith, and drain line 196, having a control valve 198 associated therewith. The regeneration sequence then proceeds as discussed above with regards to the second embodiment. This cation fines blowdown sequence of steps is preferably conducted on a periodic basis as required by a manual control procedure.

Figure 20:
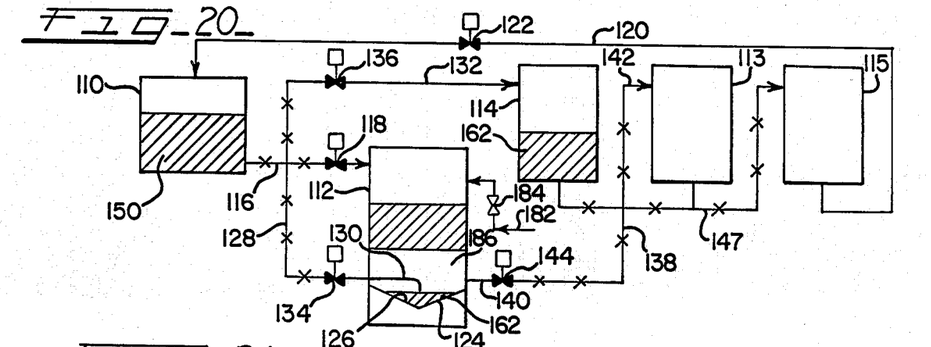
FIGS. 20-23 are diagrammatic or schematic representations illustrating the sequential steps of a fourth preferred embodiment of the invention.
Figure 21:
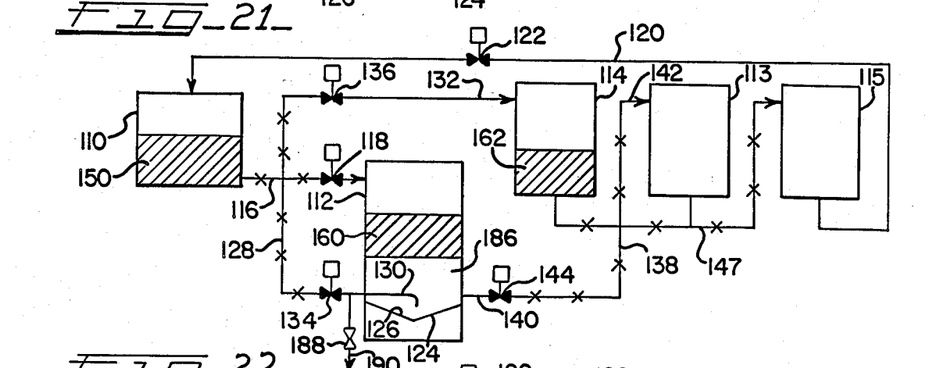
Figure 22:
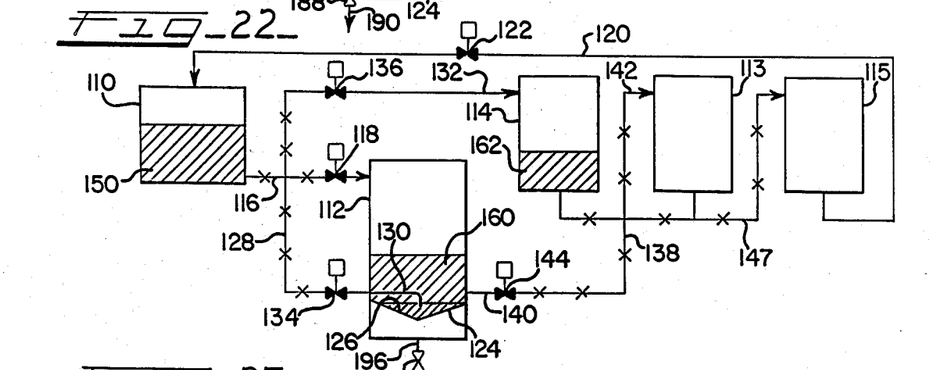
Figure 23:
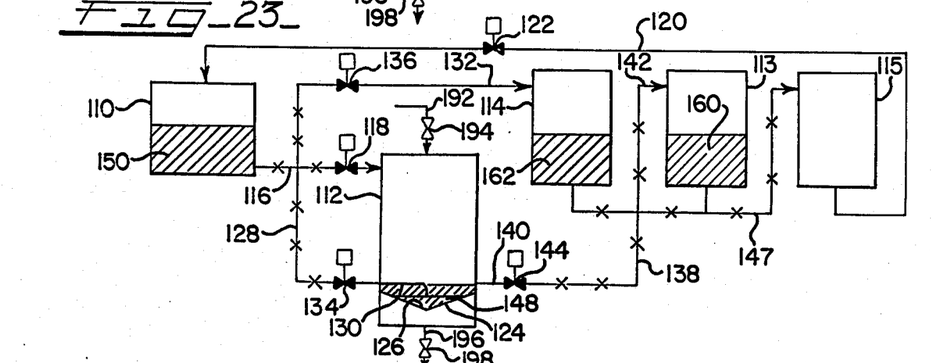

Referring to FIGS. 20–23, a fourth preferred embodiment of the invention will now be described. This embodiment is similar to the third preferred embodiment as discussed above, with the addition of a series of sequence steps to regenerate the anion resin in the separation vessel 112. In this embodiment, a moderately concentrated caustic solution (12–16%) is introduced into vessel 112 during each regeneration cycle to simultaneously separate the anion resin and cation fines and regenerate the anion resin. Referring to FIG. 20, after the step of transferring the cation resin from vessel 112, as discussed hereinabove, a caustic regenerant solution is directed into vessel 112 through line 182 at a solution strength of 12-16%, thus providing simultaneous floatation separation of traces of cation resin fines and regenerant application to the floating anion resin layer 160. Referring to FIG. 21, the settled cation fines may then be periodically withdrawn from vessel 112 as discussed above with regards to the third preferred embodiment. Referring to FIG. 22, the anion resin bed is then allowed to settle to the bottom of vessel 112 through line 196. This will ensure that any cation fines which still remain are entrained in the lower portion of the regenerated anion layer 160 within area 126 below the take off point of anion transfer conduit 138. Referring to FIG. 23, the regenerated anion resin in vessel 112 is then purge rinsed by directed water into vessel 112 through line 192 and out through line 196. The regenerated anion resin is then transferred through conduit 138 into vessel 113 and the sequence of steps discussed above with regards to the second embodiment are initiated to complete the regeneration cycle. However since the anion resin in vessel 113 is already regenerated, it is not necessary to direct regenerant solution through vessel 113 as set forth with regards to the second embodiment. This embodiment ensures elimination of sodium form cation resin beads or fines from the regenerated bed of anion exchange resin and permits the system to operate beyond the ammonia breakpoint and thereby enhances the performance of those systems utilizing an existing ammoniation technique.

The regeneration methods as described hereinabove provide efficient techniques for isolating the anion resin and cation resin in separate vessels for regeneration. The methods eliminate the necesity of providing an external buffer volume receiver tank and attendant valves and controls. Further, the principles of these techniques may be retrofitted to existing regeneration systems with minimal impact on the existing equipment and only minor piping and sequence changes.

Many modifications and variations as hereinbefore set forth will occur to those skilled in the art, and it is intended to cover in the appended claims all such modifications and variations as fall within the true spirit and scope of the claims.

What is claimed is:

1. A method for regenerating a mixture of exhausted anion and cation exchange resins from a mixed bed demineralizer, comprising:
   (a) transferring the exhausted anion and cation resins into a separation/anion regeneration vessel containing a buffer volume of anion and cation resins;
   (b) passing a classifying liquid through the separation/anion regeneration vessel so as to separate the resins contained therein into an upper anion resin layer, a lower cation resin layer, and an intermingled anion and cation resin interface layer intermediate the anion resin layer and the cation resin layer;
   (c) transferring resin from the separation/anion regeneration vessel into and through a cation transfer conduit having a first end portion in communication with a lowermost portion of the separation/anion regeneration vessel and a second end portion in communication with a cation regeneration/hold vessel, the first end portion having a first control valve associated therewith and the second end portion having a second control valve associated therewith;
   (d) terminating the transfer of the resin from the separation/anion regeneration vessel into the cation transfer conduit and closing the first and second control valves upon the detection of the entry of anion resin into the cation transfer conduit such that the bulk of the cation resin is transferred into the cation regeneration/hold vessel, the bulk of the lower layer of anion resin remains in the separation/anion regeneration vessel and the bulk of the intermingled anion and cation resin interface layer is isolated in the cation transfer conduit between the first and second control valves;
   (e) passing a regenerant liquid through the resin in the cation regeneration/hold vessel to regenerate the cation resin contained therein;
   (f) passing a regenerant liquid through the resin in the separation/anion regeneration vessel to regenerate the anion resin contained therein;
   (g) separating the resin in the separation/anion regeneration vessel into an upper layer of regenerated anion resin and a lower layer of remaining cation resin;
   (h) transferring the bulk of the upper layer of regenerated anion resin from the separation/anion regeneration vessel to the cation regeneration/hold vessel while leaving a measurable quantity of the regenerated anion resin and the lower layer of remaining cation resin in the separation/anion regeneration vessel; and
   (i) directing the intermingled anion and cation resin isolated in the cation resin transfer conduit back into the separation/anion regeneration vessel so as to form the regenerated anion resin and the cation resin buffer volume with the anion and cation resin remaining in the separation/anion regeneration vessel.

2. The method as defined in claim 1 wherein the detection of the entry of anion resin into the cation transfer conduit is sensed by measuring the conductivity of the slurry in the cation resin transfer conduit a short distance downstream of the first control valve.

3. The method as defined in claim 1 wherein the separation of the resin in the separation vessel in step (g) is achieved by directing a classifying liquid upwardly through the separation/anion regeneration vessel.

4. The method as defined in claim 1 wherein the classifying liquid has a density intermediate the density of the anion resin and the cation resin.

5. The method as defined in claim 4 including the step of periodically removing the settled cation resin from the separation/anion regeneration vessel prior to transfer of the anion resin therefrom.

6. The method as defined in claim 1 wherein steps (f) and (g) are achieved by passing an intermediate density caustic solution through the resins in the separation/anion regeneration vessel to simultaneously regenerate the anion resin and float an upper layer of regenerated anion resin above a layer of the caustic solution and cause a lower layer of cation resin to settle to the bottom of the separation/anion regeneration vessel.

7. The method as defined in claim 1 wherein the regenerated anion resin is transferred from the separation/anion regeneration vessel in step (h) through an anion transfer conduit having a first end in communication with the separation/anion regeneration vessel at an elevation above the elevation of the first end of the cation transfer conduit in communication with a lower portion of the regenerated anion resin layer and a second end in communication with the cation regeneration and hold vessel.

8. The method as defined in claim 7 wherein the separation/anion regeneration vessel has a bottom conical section and the first end of the cation transfer conduit is in fluid communication with the lowermost portion of the conical section and the first end of the anion transfer conduit is in fluid communication with the separation/anion regeneration vessel a short distance above the conical section.

9. The method as defined in claim 1 further including the step of backwashing the resin in the separation/anion regeneration vessel prior to passing the classifying liquid therethrough.

10. A method for regenerating a mixture of exhausted anion and cation exchange resins from a mixed bed demineralizer, comprising:
  (a) transferring the exhausted anion and cation resins into a separation vessel containing a buffer volume of anion and cation resins;
  (b) passing a classifying liquid through the separation regeneration vessel so as to separate the resins contained therein into an upper anion resin layer, a lower cation resin layer, and an intermingled anion and cation resin interface layer intermediate the anion resin layer and the cation resin layer;
  (c) transferring resin from the separation regeneration vessel into and through a cation transfer conduit having a first end portion in communication with a lowermost portion of the separation vessel and a second end portion in communication with a cation regeneration vessel, the first end portion having a first control valve associated therewith and the second end portion having a second control valve associated therewith;
  (d) terminating the transfer of the resin from the separation regeneration vessel into the cation transfer conduit and closing the first and second control valves upon the detection of the entry of anion resin into the cation transfer conduit such that the bulk of the upper layer of cation resin is transferred into the cation regeneration vessel, the bulk of the lower layer of anion resin remains in the separation vessel and the bulk of the intermingled anion and cation resin interface layer is isolated in the transfer conduit between the first and second control valves;
  (e) transferring the bulk of the upper layer of anion resin remaining in the separation vessel to an anion regeneration vessel while leaving a measurable quantity of anion resin from a lower portion of the upper layer of anion resin and a lower layer of remaining cation resin in the separation vessel;
  (f) passing a regenerant liquid through the resin in the cation regeneration vessel to regenerate the cation resin contained therein;
  (g) passing a regenerant liquid through the resin in the anion regeneration vessel to regenerate the anion resin contained therein; and
  (h) directing the intermingled anion and cation resin isolated in the cation transfer conduit back into the separation vessel so as to form the anion and cation resin buffer volume with the regenerated anion resin and the cation resin remaining in the separation vessel.

11. The method as defined in claim 10 wherein the anion resin is transferred from the separation vessel in step (e) through an anion transfer conduit having a first end in communication with the separation vessel at an elevation in communication with a lower portion of the upper layer of anion resin and a second end in communication with the anion regeneration vessel.

12. The method as defined in claim 11 wherein the separation vessel has a bottom conical section and the first end of the cation resin transfer conduit is in fluid communication with the lowermost portion of the conical section and the first end of the anion resin transfer conduit is in fluid communication with the separation vessel a short distance above the conical section.

13. The method as defined in claim 10 further including the step of backwashing the resin in the separation vessel prior to passing the classifying liquid therethrough.

14. The method as defined in claim 10 including the step of directing an intermediate density liquid into the separation vessel after transfer of the cation resin and prior to transfer of the anion resin therefrom so as to float a layer of the anion resin above a layer of intermediate density liquid and cause any remaining cation resin to settle to the bottom of the separation vessel.

15. The method as defined in claim 14 wherein the intermediate density liquid is a dilute caustic solution.

16. The method as defined in claim 14 including the step of periodically removing the settled cation resin from the separation vessel prior to transfer of the anion resin therefrom.

17. A method for regenerating a mixture of exhausted anion and cation exchange resins from a mixed bed demineralizer, comprising:
  (a) transferring the exhausted anion and cation resins into a separation/anion regeneration vessel containing a buffer volume of anion and cation resins;
  (b) passing a classifying liquid through the separation/anion regeneration vessel so as to separate the resins contained therein into an upper anion resin layer, a lower cation resin layer, and an intermingled anion and cation resin interface layer intermediate the anion resin layer and the cation resin layer;
  (c) transferring resin from the separation/anion regeneration vessel into and through a cation transfer conduit having a first end portion in communication with a lowermost portion of the separation/anion regeneration vessel and a second end portion in communication with a cation regeneration vessel, the first end portion having a first control valve associated therewith and the second end portion having a second control valve associated therewith;
  (d) terminating the transfer of the resin from the separation/anion regeneration vessel into the cation transfer conduit and of closing the first and second control valves upon the detection of the entry of anion resin into the cation transfer conduit such that the bulk of the cation resin is transferred into the cation regeneration, the bulk of the lower layer of anion resin remains in the separation/anion regeneration vessel and the bulk of the intermingled anion and cation interface layer is isolated in the transfer conduit between the first and second control valves;
  (e) passing a dilute caustic solution through the resin in the separation/anion regeneration vessel so as to simultaneously regenerate the anion resin and float a layer of the regenerated anion resin above a layer of the dilute caustic solution and cause any remaining cation resin to settle to the bottom of the separation vessel;

(f) passing a regenerant liquid through the resin in the cation regeneration vessel to regenerate the cation resin contained therein; and (g) transferring the bulk of the regenerated anion resin from the separation/anion regeneration vessel while leaving a measurable quantity of the regenerated anion resin and the settled cation resin in the separation/anion regeneration vessel;

(h) directing the intermingled anion and cation resin isolated in the transfer conduit back into the separation/anion regeneration vessel so as to form the anion and cation resin buffer volume with the anion and cation resin remaining in the separation/anion regeneration vessel.

* * * * *